United States Patent [19]

Brorson et al.

[11] Patent Number: 5,433,500
[45] Date of Patent: Jul. 18, 1995

[54] CAMPER SHELL REINFORCEMENT DEVICE

[75] Inventors: Lon Brorson; Marland Lee, both of Grand Forks, N. Dak.

[73] Assignee: New Vision Fiberglass Inc., Grand Forks, N. Dak.

[21] Appl. No.: 169,425

[22] Filed: Dec. 17, 1993

[51] Int. Cl.$^6$ .................... B60P 3/32; B60P 7/02
[52] U.S. Cl. .................... 296/164; 296/219; 296/100
[58] Field of Search ............ 296/29, 30, 100, 156, 296/164, 165; 135/88

[56] References Cited

U.S. PATENT DOCUMENTS

| | | | |
|---|---|---|---|
| 4,462,629 | 7/1984 | Todori et al. | 296/30 |
| 5,121,960 | 6/1992 | Wheatley | 296/100 |
| 5,251,951 | 10/1993 | Wheatley | 296/100 |
| 5,261,719 | 11/1993 | Tucker | 296/100 |
| 5,263,761 | 11/1993 | Hathaway et al. | 296/100 |
| 5,275,458 | 1/1994 | Barben et al. | 296/100 |

Primary Examiner—Dean J. Kramer
Attorney, Agent, or Firm—Robert E. Kleve

[57] ABSTRACT

The invention comprises a camper shell corner reinforcement device for mounting the corner of a camper shell, trim, and base mounting of the camper shell together and for reinforcing their connection in the corner. The device has two brackets. One bracket has an elongated frame with a curved end and with an inclined wall extending about the curved end. The elongated frame portion is inserted in the end of the tubular portion of the base mounting for the shell which base mounting and its tubular portion extends along the bottom outer edge of the shell, along the opposing sides to the rear corners of the shell with the curved portion extending around the corner of the shell with the inclined curved wall providing a curved inside backing or reinforcing wall for the shell for the portions of the shell extending around the corner. The curved wall portion provides a continuation of the tubular portion around the corner and provides an upward surface inside the corner of the shell for mounting the shell, trim, and base together. The device has a second bracket which mounts over the curved wall of the first bracket and serves as a cover plate.

2 Claims, 1 Drawing Sheet

CAMPER SHELL REINFORCEMENT DEVICE

This invention relates to reinforcement devices and apparatus.

It is an object of the invention to provide a novel reinforcement device for attachment to the corners of a camper shell to provide a structural extension about the corners of the shell for the application and securement of the shell, trim, and base mounting together in a manner to reinforce the corner of the shell.

It is another object of the invention to provide a novel reinforcement device providing a continuation about the corners of a vehicle shell for substantially uninterrupted corner surfaces for mounting the shell and shell trim together.

It is another object of the invention to provide a novel corner extension for a plastic shell.

Further objects and advantages of the invention will become apparent as the description proceeds and when taken in conjunction with the accompanying drawing wherein:

BRIEF DESCRIPTION OF PREFERRED EMBODIMENT OF THE INVENTION

The invention comprises a camper shell corner reinforcement device for mounting in the corner of the camper shell to secure the camper shell, trim and base mounting of the shell together. The device has two brackets, one bracket has an elongated frame with a curved end for insertion in the end of the tubular mounting along the outer base of the shell to provide a curved upward extending support to continue the tubular base surfaces in effect about the corner of the shell, to provide an substantially uninterrupted upward surface for mounting the shell, trim, and base mounting together. The device has a second bracket which serves as an inside cover plate for the curved end of the extension.

Figure 1:
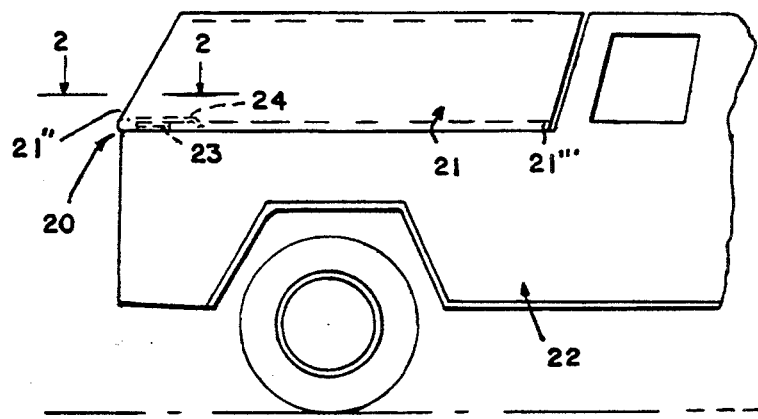
FIG. 1 is a side elevational view of the camper shell corner reinforcement device shown installed in the opposite rear corners of a camper shell.
Figure 2:
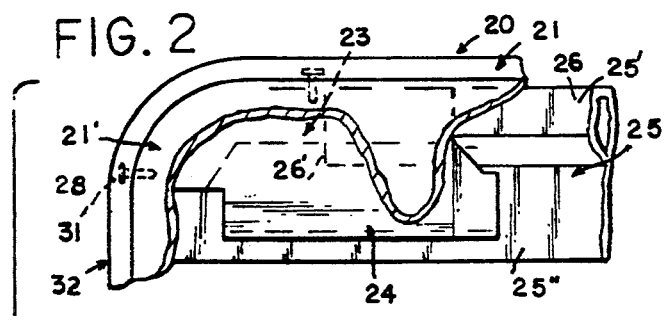
FIG. 2 is an enlarged fragmentary top view of the right and left rear corners of the camper shell illustrating the brackets of the corner reinforcement devices installed in the camper shell to connect and support the camper shell, base mounting of the shell and trim of the shell together in a manner to reinforce the corners of the shell.
Figure 3:
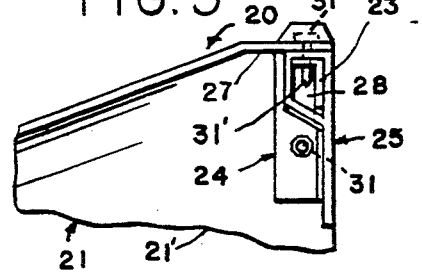
FIG. 3 is an enlarged fragmentary end view of the reinforcement devices shown installed in the rear corners of the shell.
Figure 4:
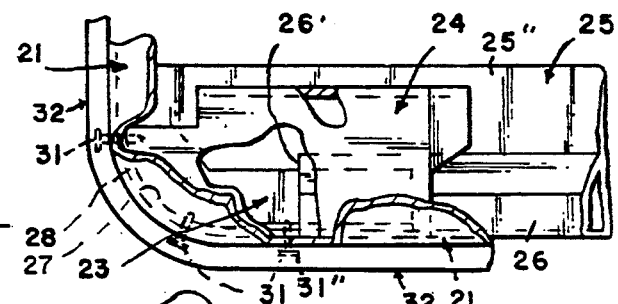
FIG. 4 is an enlarged side elevational view of the one corner of the camper shell with the reinforcement device shown installed.
Figure 7:
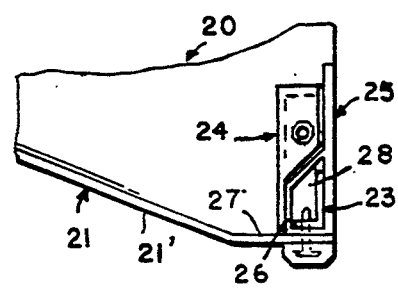
FIG. 7 is a top plan view of the corner extension bracket providing a corner extension for the mounting base of the shell of the reinforcement device.
Figure 5:
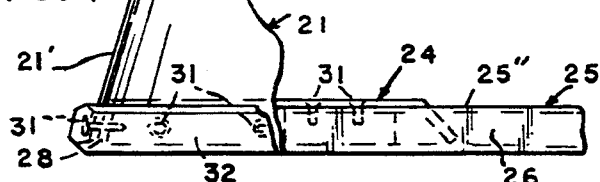
FIG. 5 is an enlarged top plan view of the corner plate of the reinforcement device.
Figure 6:
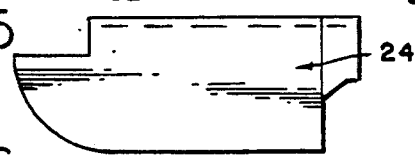
FIG. 6 is a side elevational view of the corner plate of the reinforcement device.
Figure 8:
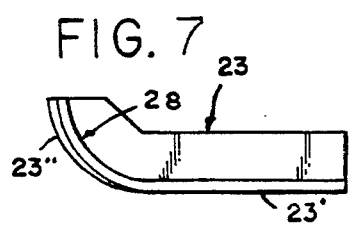
FIG. 8 is a side elevational view of of the corner extension bracket of the reinforcement device.

Referring more particularly to the drawing, in FIG. 1 the camper shell corner reinforcement device 20 is illustrated having a camper shell 21 mounted in the corner 21' of the camper shell 21 of camper 22. In the enlarged top view of FIG. 2, taken along line 2—2 of FIG. 1, two of the reinforcement devices 20 are illustrated mounted in the left and right rear corners 21' and 21" of the rear of the camper shell. The reinforcement device 20 has two brackets, an elongated extension bracket 23 and a cover bracket 241. The brackets, 23 and 24 are mounted in the corners of the shell 21 of the camper 22, with the one bracket 23 having an elongated end portion 23' which extends into the tubular end portion 25' of the mounting plate 26'.

The mounting plate 25 has an elongated bottom plate portion 25" which extends along the bottom outer edge of the camper shell from the front corners 21'"of the shell to the rear corners 21' and 21" of the shell and serves as a bottom for the outer side edges of the shell. The mounting plate 25 also has an elongated tubular portion 26 which extends from the front corners 21'" of the shell to the rear corners 21" and 21' and terminates short of the rear corners at their rear open end 26'. The elongated rib 26 serves as an upward extending inclined inner reinforcing wall for the inside lower side edge surfaces 27 of the camper and is adjacent thereto.

The extension bracket or plate 23, having its elongated portion 23' at it one end, which extends into the open end 26' of the tubular rib adjacent the rear corners of the shell and has a curved opposing end 23" with a curved upwardly inclined wall 28 extending around the outside circumference of the curved end portion and serves as curved inside corner reinforcing corner wall and corner reinforcing surface for the left and rear corners of the shell. The inclined wall portion 28 in addition to providing a inside corner reinforcing wall for the shell 21 also provides a mounting surface for the inner ends 31' of the rivets 31 to adhere to. An elongated flat plastic trim 32 will extend along the outside of the camper shell 21 and and continues in a curve around the rear corners of the shell. The rivets 31 will have an enlarged head 31" at their outer ends which engages against the outside of the trim to hold the trim to the shell while the rivet 31 extends through the trim and shell into the inclined inner wall portion 28 of the extension bracket and adheres to the inner wall 28 to thereby fix the shell and trim to the curved corner of the shell by its connection, with the curved wall of the extension bracket 23.

The device 20 will be installed into the camper shell 21 by first riveting the trim 32, the side edges of the shell 21, the elongated rib portion 26" of the mounting plate 25, and the elongated portion 23' of the extension bracket together with the elongated portion 23' of the bracket extending into the open end 26'.

The curved inclined wall portion 28 of the extension bracket will extend out the open end 26' of the rib and be in snug contact with the curved inside corner wall 21' or 21" of the camper shell. Additional rivets 31 will have their heads against the outside of the flat trim 32 around the rear corners of the shell with the rivets extending through the corners of the shell into the inclined curved wall portion 28 and will adhere to the curved wall portion 28 to hold the trim, the corners of the shell, and curved wall portion 28 of the extension bracket together.

Thereafter, the cover plate 24 can be riveted to the top 25" of the tubular rib portion 26 of the mounting plate 25 by additional rivets 31 while a portion of the cover plates covers the curved wall portion 28 of the extension bracket and the cover plate 24 thereby serves as an extension to the top of the tubular portion 26 of the mounting plates for the corners of the shell.

The inner arc or curvature of the corners of the shell 21 may be smaller than the arc or curvature of the wall portion 28 of plate 23, and plate 23 will still fit firmly to the curved shell, since the curved wall 28 will still engage the inner curved wall of the shell at 90 degrees apart, where the outer two rivets 31 are located, and thereby still provide a snug fit between the two members where they are connected together by the two rivets.

Thus, it will be seen that a novel corner reinforcement device has been provided for reinforcing the corner portions of the camper shell with a curved inner wall adjacent to and at least closely conforming to the inside curvature of the corners of the camper shell at the rear of the camper shell, and which reinforcement bracket and cover plate are made of relatively strong-aluminum. It will also be seen that the curved wall portion provides a mounting surface for the rivets to secure the shell, trim, and extension bracket together.

It will be obvious that various changes and departures may be made to the invention without departing from the spirit and scope thereof, and accordingly, it is not intended that the invention be limited to that specifically described in the specification or as illustrated in the drawing, but only as set forth in the appended claims wherein:

What is claimed is:

1. A camper shell reinforcement device for reinforcing a camper shell at its corner along the bottom of the shell and a tubular portion extending along the bottom of the shell and a trim along the outside of the shell where the shell, tubular portion, and trim connect together, said device comprising a first and second bracket, said first bracket having an elongated portion with a curved end portion at one end of the elongated portion and a curved wall inclining upward and extending about the curved end of the first bracket, said elongated portion of said first bracket being adapted to be inserted in the end of the tubular portion so that the curved wall portion extends about the inside of the corner of the shell in close proximity to the shell providing a reinforcing inside backing wall for the camper shell and an inside mounting surface for rivets to adhere to at their inner ends while extending through the camper shell, tubular portion, and trim to secure the camper shell, trim, and tubular portion together, said second bracket serving to cover the curved wall of the first bracket from inside the camper shell.

2. In a camper shell having a tubular portion extending along the inside lower edges of the shell and serving as an inside lower wall for the shell with its rear end ending before the rear corners of the shell and a trim extending along the outside lower edges of opposing sides of the shell and extending around the rear corners of the shell, a camper shell reinforcement device comprising a corner bracket having an elongated frame portion at its one end adapted to be inserted into the rear end of the tubular portion adjacent one of the rear corners of the shell and having a curved opposing end with a curved inside wall extending around the outside of the curved end of the corner bracket adjacent the inside corner surfaces of the shell to provide a curved inside reinforcing backing wall for the shell and serving as a continuation of the tubular portion for the inside of one of the rear corners of the shell, riveting means extending through the trim and corner of the shell and the curved wall portion of the corner bracket to secure the trim, shell, and curved wall portion of the bracket together.

* * * * *